United States Patent
Zhuang et al.

(10) Patent No.: US 12,132,206 B1
(45) Date of Patent: Oct. 29, 2024

(54) METHOD FOR PREPARING ELECTRO-CONDUCTIVE POLYMER BINDING AGENT AND APPLICATION

(71) Applicant: Jiangsu University of Technology, Jiangsu (CN)

(72) Inventors: Yan Zhuang, Jiangsu (CN); Shuo Gao, Jiangsu (CN); Yuhui Zhao, Jiangsu (CN)

(73) Assignee: Jiangsu University of Technology, Changzhou (CN)

( * ) Notice: Subject to any disclaimer, the term of this patent is extended or adjusted under 35 U.S.C. 154(b) by 0 days.

(21) Appl. No.: 18/747,981

(22) Filed: Jun. 19, 2024

(30) Foreign Application Priority Data

Jul. 28, 2023 (CN) .......................... 202310941929.3

(51) Int. Cl.
| | | |
|---|---|---|
| H01M 4/00 | (2006.01) | |
| C08F 8/32 | (2006.01) | |
| H01M 4/134 | (2010.01) | |
| H01M 4/1395 | (2010.01) | |
| H01M 4/38 | (2006.01) | |
| H01M 4/62 | (2006.01) | |
| H01M 4/02 | (2006.01) | |

(52) U.S. Cl.
CPC .............. *H01M 4/622* (2013.01); *C08F 8/32* (2013.01); *H01M 4/134* (2013.01); *H01M 4/1395* (2013.01); *H01M 4/386* (2013.01); *H01M 2004/027* (2013.01)

(58) Field of Classification Search
CPC .... H01M 4/622; H01M 4/134; H01M 4/1395; H01M 4/386; H01M 2004/027; C08F 8/32
See application file for complete search history.

(56) References Cited

U.S. PATENT DOCUMENTS

| | | | | | |
|---|---|---|---|---|---|
| 6,001,507 | A | * | 12/1999 | Ono | H01M 4/623 429/324 |
| 7,816,482 | B1 | * | 10/2010 | Hibbs | H01M 4/621 528/86 |
| 2006/0099506 | A1 | * | 5/2006 | Krause | H01M 10/052 429/231.95 |
| 2008/0214685 | A1 | * | 9/2008 | Niitani | C08F 220/1808 521/27 |
| 2017/0069913 | A1 | * | 3/2017 | Yano | H01M 10/0525 |
| 2019/0181501 | A1 | * | 6/2019 | Ji | H01G 11/06 |

FOREIGN PATENT DOCUMENTS

CN 1410474 A 4/2003

OTHER PUBLICATIONS

"A new binder combined with PAA and PANi for Si-based anodes", Ye Li-qiang etc., Power Technology 41.11, pp. 1526-1527; Claims 1-7; Nov. 20, 2017.
"Swelling Behaviors of Polyaniline-Poly(Acrylic Acid) Hydrogels." Zhang You-wei, etc., Journal of Donghua University (English Edition) 22.2 ; pp. 100-104; Claims 1-7; Apr. 30, 2005.

* cited by examiner

*Primary Examiner* — Nicholas P D'Aniello

(57) ABSTRACT

The present disclosure specifically relates to a method for preparing an electro-conductive polymer binding agent and an application, the method including the following steps: (1) dissolving 1,3,5,7-tetrakis(4-aminophenyl)adamantane and polyacrylic acid (PAA) in deionized water to form a solution A; (2) dissolving ammonium persulfate (APS) in deionized water to form a solution B; (3) mixing the solution A with the solution B to complete polymerization and cross-linking reactions, and performing vacuum filtration and washing to obtain a hydrogel; and (4) drying the hydrogel obtained in step (3) under vacuum conditions to obtain an electro-conductive polymer binding agent. Lithium-ion batteries obtained in the present disclosure feature high capacity, high cycle stability, and long service life.

9 Claims, No Drawings ical Field

The present disclosure belongs to the technical field of materials for lithium-ion batteries, and specifically relates to a method for preparing an electro-conductive polymer binding agent and an application.

METHOD FOR PREPARING ELECTRO-CONDUCTIVE POLYMER BINDING AGENT AND APPLICATION

CROSS-REFERENCE TO RELATED APPLICATIONS

This application claims priority of Chinese Patent Application No. 202310941929.3, filed on Jul. 28, 2023, the entire contents of which are incorporated herein by reference.

TECHNICAL FIELD

The present disclosure belongs to the technical field of materials for lithium-ion batteries, and specifically relates to a method for preparing an electro-conductive polymer binding agent and an application.

BACKGROUND

In the research of negative electrode materials for lithium-ion batteries, silicon material has become a research hotspot in the field of new energy batteries in recent years with a theoretical specific capacity as high as 4200 mAh g$^{-1}$. However, in the lithiation/delithiation process, the volume of silicon negative electrode changes by as high as 300%, resulting in rapid capacity attenuation and short cycle life. To improve the cycle stability of silicon negative electrodes, a series of efforts in the areas of silicon material nanosizing, the design and preparation of silicon composite materials, the development of new electrolyte additives, and pre-lithiation of silicon materials have been made in the scientific community, significantly improving the cycle life of silicon negative electrodes. Compared with some modification strategies with complicated preparation process and high cost, the modification of silicon negative electrodes by a reasonably designed binding agent is more favorable for mass production and has good potential for practical application. However, conventional polyvinylidene fluoride (PVDF) binding agents are not suitable for silicon negative electrodes because there is weak van der Waals interaction between the PVDF binding agents and the silicon materials and the copper current collectors. Although researchers have made great efforts in designing and preparing silicon negative electrode binding agents and have developed many binding agents that are effective in improving cycle performance of silicon, it is still a major challenge to solve the problems of low initial efficiency, low active substance content and low area capacity faced by silicon negative electrodes through rational design of binding agents.

As an important component in energy storage devices, binding agents had been neglected by the scientific community for a long time. Nowadays, researchers have recognized that the binding agent is crucial to the electro-chemical performance of the electrode, and in particular, for silicon negative electrodes showing a much high volume expansion during charge/discharge cycles, a reasonably designed advanced binding agent can greatly improve their cycle life. At the same time, compared with some modification strategies with complicated preparation process and high cost, the optimization of silicon negative electrodes through the reasonably designed binding agent is more favorable for mass production and has good potential for practical application. Accordingly, the research of binding agent represented by silicon-based negative electrode binding agent has become one of the current research hotspots in the energy storage community.

In view of the above, the present disclosure proposes a method for preparing an electro-conductive polymer binding agent for a silicon negative electrode of a lithium-ion battery. The prepared polymer binding agent is combined with silicon powder to avoid capacity degradation brought about by the broken of the silicon powder during charge and discharge.

SUMMARY

To solve the above problems in the prior art, the present disclosure specifically proposes a method for preparing an electro-conductive polymer binding agent and an application in silicon-based negative electrode materials for lithium batteries, and lithium-ion batteries obtained by using the electro-conductive polymer binding agent feature high capacity, high cycle stability, and long service life.

To realize the above objective, the present disclosure provides a method for preparing an electro-conductive polymer binding agent, including the following steps:

(1) dissolving 1,3,5,7-tetrakis(4-aminophenyl)adamantane and polyacrylic acid (PAA) in deionized water, followed by stirring at room temperature to form a solution A;

(2) dissolving ammonium persulfate (APS) in deionized water to form a solution B;

(3) mixing the solution A with the solution B, followed by standing in an ice bath to complete polymerization and cross-linking reactions, and performing vacuum filtration and washing to obtain a hydrogel; and (4) drying the hydrogel obtained in step (3) under vacuum conditions to obtain an electro-conductive polymer binding agent.

Preferably, a mass ratio of the 1,3,5,7-tetrakis(4-aminophenyl)adamantane to the PAA is 0.05-1, and the solution A is at a concentration of 20 g/L-200 g/L.

Preferably, in step (2), the APS is added in an amount of 1:3 of a mass of the 1,3,5,7-tetrakis(4-aminophenyl)adamantane.

Preferably, the standing in step (3) is performed for a period of 6-24 h. In the standing process, 1,3,5,7-tetrakis(4-aminophenyl)adamantane undergoes polymerization under the action of APS, and the polymerized polymerization chain can be connected to multiple PAA molecules to form an overall macro-molecular structure. The formed macro-molecular binding agent interacts with a silicon negative electrode material. After silicon powder is broken in the process of charge and discharge, the broken silicon powder can still be used as a whole because silicon is connected to macro-molecules of the binding agent, avoiding the volume expansion caused by the broken silicon powder, and thus improving the high capacity and cycle performance of lithium-ion batteries.

Preferably, the drying in step (4) is performed at a temperature of 80-100° C. for a period of 1-12 h.

Another objective of the present disclosure is to provide an application of an electro-conductive polymer binding agent prepared by a method as described above in a negative electrode of a lithium battery, an electro-conductive polymer boding agent being mixed with a silicon-based negative electrode material to prepare negative plates of a lithium battery.

Specifically, the electro-conductive polymer binding agent is mixed with the silicon-based negative electrode material in deionized water to form a negative electrode slurry, and a copper foil is coated with the negative electrode slurry, followed by drying and slicing to obtain the negative plates of the lithium battery.

Advantageous Effects (1) In the present disclosure, 1,3,5,7-tetrakis(4-aminophenyl)adamantane undergoes polymerization under the action of APS, and the polymerized polymerization chain can be connected to multiple PAA molecules to form a macromolecular electro-conductive binding agent to enhance the mechanical-electrochemical performance between silicon nanoparticles and the binding agent. Silicon negative electrodes manufactured by this binding agent have high cycle stability and high charge and discharge efficiency, and can inhibit electrode expansion.

(2) The enhanced adhesion between the binding agent prepared by the present disclosure and the silicon nanoparticles can tightly bind the particles to form a solid electrode, and the silicon negative electrode manufactured by the binding agent exhibits excellent structural stability in long-term cycling.

(3) The lithium-ion secondary battery active substance binding agent prepared by the present disclosure is aqueous, which reduces the residue of toxic volatile organic substances and improves the use safety of a product. The binding agent is simple in operation and inexpensive in preparation, requires simple and convenient equipment and is easy to produce on a large scale.

DETAILED DESCRIPTION

The technical solutions of the present disclosure are further illustrated in combination with the specific examples, but the present disclosure is not limited to this. Any modifications or equivalent replacements of the technical solutions of the present disclosure, without departing from the spirit and scope of the technical solutions of the present disclosure, shall be covered by the scope of protection of the present disclosure.

The preparation and testing processes of a button half battery of the present disclosure are as follows.

0.1-1 g of a silicon-based negative electrode material (50 nm-5 μm) is mixed with 1-2 g of a prepared electro-conductive polymer in an aqueous solution, followed by stirring to form an even negative electrode slurry. A copper coil is evenly coated with the slurry, followed by drying at 100° C., rolling, and stamping to obtain a 12 nm round silicon negative plate. After being subjected to vacuum drying at 100° C., the silicon negative plate is placed in a dry glove box under an argon atmosphere (the content of $H_2O$ and $O_2$ in the glove box being less than 0.1 ppm), and paired with a metal lithium electrode to assemble into a button half battery, with IM of lithium hexafluorophosphate as an electrolyte (ethylene carbonate (EC)/dimethyl carbonate (DMC)/ethyl methyl carbonate (EMC)=1:1:1 (v)), and a diaphragm being made of polypropylene.

Example 1

(1) 0.3 g of 1,3,5,7-tetrakis(4-aminophenyl)adamantane and 1.5 g of PAA were dissolved in 30 mL of deionized water, followed by stirring at room temperature for 30 min to form a solution A.

(2) 0.1 g of APS was dissolved in 5 mL of deionized water to form a solution B.

(3) The solution A was mixed with the solution B, followed by standing in an ice bath for 12 h to complete polymerization and cross-linking reactions, and vacuum filtration and washing with deionized water were performed to remove excess impurities and by-products to obtain a hydrogel.

(4) The hydrogel obtained in step (3) was dried at 100° C. for 6 h under vacuum conditions to remove excess water to obtain an electro-conductive polymer binding agent.

Example 2

(1) 0.3 g of 1,3,5,7-tetrakis(4-aminophenyl)adamantane and 6 g of PAA were dissolved in 30 mL of deionized water, followed by stirring at room temperature for 30 min to form a solution A.

(2) 0.1 g of APS was dissolved in 5 mL of deionized water to form a solution B.

(3) The solution A was mixed with the solution B, followed by standing in an ice bath for 24 h to complete polymerization and cross-linking reactions, and vacuum filtration and washing with deionized water were performed to remove excess impurities and by-products to obtain a hydrogel.

(4) The hydrogel obtained in step (3) was dried at 100° C. for 12 h under vacuum conditions to remove excess water to obtain an electro-conductive polymer binding agent.

Example 3

(1) 0.3 g of 1,3,5,7-tetrakis(4-aminophenyl)adamantane and 0.3 g of PAA were dissolved in 30 ml of deionized water, followed by stirring at room temperature for 30 min to form a solution A.

(2) 0.1 g of APS was dissolved in 5 mL of deionized water to form a solution B.

(3) The solution A was mixed with the solution B, followed by standing in an ice bath for 6 h to complete polymerization and cross-linking reactions, and vacuum filtration and washing with deionized water were performed to remove excess impurities and by-products to obtain a hydrogel.

(4) The hydrogel obtained in step (3) was dried at 100° C. for 4 h under vacuum conditions to remove excess water to obtain an electro-conductive polymer binding agent.

Example 4

0.05 g of the electro-conductive polymer binding agent prepared in Example 1 was taken and dissolved in 10 ml of deionized water, and 0.2 g of a silicon-based negative electrode material (commercially available, and purchased from Zhejiang Xintie Metal Material Co., Ltd.) was added, followed by mixing evenly to form a negative electrode slurry. A copper foil was evenly coated with the slurry, followed by drying at 100° C., rolling, and stamping to prepare a 12 nm round silicon negative plate, which, after being subjected to vacuum drying at 100° C. for 12 h, was placed in a glove box filled with argon gas (the content of $H_2O$ and $O_2$ in the glove box being less than 0.1 ppm), and paired with a metal lithium electrode to assemble into a half battery, with 1 M of lithium hexafluorophosphate as an electrolyte (EC/DMC/EMC=1:1:1 (v)), and a polypropylene diaphragm as a diaphragm.

After testing, a lithium-ion half battery prepared using the electro-conductive polymer binding agent obtained in Example 1 was charged and discharged at a current of 0.5 C, with a first reversible capacity of 3200 mAh/g, and without material-dropping of the electrode. After repeated testing, the charge and discharge performance of lithium-ion half batteries prepared using the electro-conductive polymer boding agents obtained in Examples 2-3 has little difference from that of Example 1.

Example 5

The silicon negative plate prepared in Example 4 was assembled into a full battery for performance testing, with $LiCoO_2$ as a positive electrode, 1 M of lithium hexafluorophosphate as an electrolyte (EC/DMC/EMC=1:1:1 (v)), and a polypropylene diaphragm as a diaphragm. The test results are shown in Table 1.

Example 6

The silicon negative plate prepared in Example 4 was assembled into a full battery for performance testing, with $LiMn_2O_4$ as a positive electrode, 1 M of lithium hexafluorophosphate as an electrolyte (EC/DMC/EMC=1:1:1 (v)), and a polypropylene diaphragm as a diaphragm. The test results are shown in Table 1.

Example 7

The silicon negative plate prepared in Example 4 was assembled into a full battery for performance testing, with $LiNi_{0.8}CO_{0.1}Mn_{0.1}O_2$ as a positive electrode, 1 M of lithium hexafluorophosphate as an electrolyte (EC/DMC/EMC=1:1:1 (v)), and a polypropylene diaphragm as a diaphragm. The test results are shown in Table 1.

Example 8

The silicon negative plate prepared in Example 4 was assembled into a full battery for performance testing, with $LifePO_4$ as a positive electrode, 1 M of lithium hexafluorophosphate as an electrolyte (EC/DMC/EMC=1:1:1 (v)), and a polypropylene diaphragm as a diaphragm. The test results are shown in Table 1.

Comparative Examples 1-4

A silicon negative plate prepared by a PVDF binding agent instead of the "electro-conductive polymer binding agent" in Example 4 was assembled into a full battery for performance testing, with $LiCoO_2$, $LiMn_2O_4$, $LiNi_{0.8}CO_{0.1}Mn_{0.1}O_2$, and $LiFePO_4$ as a positive electrode separately. The test results are shown in Table 1.

1 M of lithium hexafluorophosphate (EC/DMC/EMC=1:1:1 (v)) was used as an electrolyte, and a polypropylene diaphragm was used as a diaphragm.

TABLE 1

Charge/discharge performance parameters and cycle capacity retention ratio of various types of batteries

| Group | Positive/negative electrode material | Positive electrode capacity per gram/mAh | Battery median voltage/V | Capacity retention after 100 cycles/% | Capacity retention after 300 cycles/% | Capacity retention after 500 cycles/% |
|---|---|---|---|---|---|---|
| Example 5 | $LiCoO_2$/Si | 145 | 3.7 | 97.5 | 93.2 | 90 |
| Example 6 | $LiMn_2O_4$/Si | 108 | 3.8 | 97.1 | 93.6 | 89.3 |
| Example 7 | $LiFePO_4$/Si | 139 | 3.4 | 98.3 | 94.1 | 91.2 |
| Example 8 | $LiNi_{0.8}Co_{0.1}Mn_{0.1}O_2$/Si | 182 | 3.7 | 98.4 | 96.1 | 92.5 |
| Comparative Example 1 | $LiCoO_2$/Si | 133 | 3.75 | 96.1 | 92.3 | 88.3 |
| Comparative Example 2 | $LiMn_2O_4$/Si | 102 | 3.75 | 96.2 | 91.6 | 85.1 |
| Comparative Example 3 | $LiFePO_4$/Si | 134 | 3.4 | 97.2 | 92.4 | 87.3 |
| Comparative Example 4 | $LiNi_{0.8}Co_{0.1}Mn_{0.1}O_2$/Si | 179 | 3.6 | 98.1 | 93.9 | 87.8 |

As can be seen from Table 1, the lithium-ion secondary battery assembled with the electro-conductive polymer binding agent prepared by the method of the present disclosure has obvious effects in improving the safety and cycle stability of the lithium-ion battery as well as prolonging the service life of the lithium-ion battery, and the binding agent of the present disclosure can be widely used in the manufacture of lithium-ion batteries.

The present disclosure is not limited to the above examples, and on the basis of the technical solutions disclosed in the present disclosure, those skilled in the art may make some substitutions and deformations to some of the technical features therein according to the disclosed technical contents without creative efforts, and these substitutions and deformations are within the scope of protection of the present disclosure.

The invention claimed is:

1. A method for preparing an electro-conductive polymer binding agent for a negative electrode, comprising the following steps:
   (1) dissolving 1,3,5,7-tetrakis(4-aminophenyl)adamantane and polyacrylic acid (PAA) in deionized water, followed by stirring at room temperature to form a solution A, a mass ratio of the 1,3,5,7-tetrakis(4-aminophenyl)adamantane to the PAA being 0.05-1;
   (2) dissolving ammonium persulfate (APS) in deionized water to form a solution B, the APS being added in an amount of 1:3 of a mass of the 1,3,5,7-tetrakis(4-aminophenyl)adamantane;

(3) mixing the solution A with the solution B, followed by standing in an ice bath for 6-24 h to complete polymerization and cross-linking reactions, and performing vacuum filtration and washing to obtain a hydrogel; and (4) drying the hydrogel obtained in step (3) under vacuum conditions to obtain an electro-conductive polymer binding agent.

2. The method for preparing an electro-conductive polymer binding agent according to claim 1, wherein the solution A is at a concentration of 20 g/L-200 g/L.

3. The method for preparing an electro-conductive polymer binding agent according to claim 1, wherein in step (4), the drying is performed at a temperature of 80-100° C. for a period of 1-12 h.

4. A method for forming a lithium battery, comprising:
applying the electro-conductive polymer binding agent prepared by the method according to claim 1 in a negative electrode of the lithium battery, the electro-conductive polymer binding agent being mixed with a silicon-based negative electrode material to prepare negative plates of the lithium battery.

5. A method for forming a lithium battery, comprising:
applying the electro-conductive polymer binding agent prepared by the method according to claim 2 in a negative electrode of the lithium battery, the electro-conductive polymer binding agent being mixed with a silicon-based negative electrode material to prepare negative plates of the lithium battery.

6. A method for forming a lithium battery, comprising:
applying the electro-conductive polymer binding agent prepared by the method according to claim 3 in a negative electrode of the lithium battery, the electro-conductive polymer binding agent being mixed with a silicon-based negative electrode material to prepare negative plates of the lithium battery.

7. The method of forming a lithium battery according to claim 4, wherein the electro-conductive polymer binding agent is mixed with the silicon-based negative electrode material in deionized water to form a negative electrode slurry, and a copper foil is coated with the negative electrode slurry, followed by drying and slicing to obtain the negative plates of the lithium battery.

8. The method of forming a lithium battery according to claim 5, wherein the electro-conductive polymer binding agent is mixed with the silicon-based negative electrode material in deionized water to form a negative electrode slurry, and a copper foil is coated with the negative electrode slurry, followed by drying and slicing to obtain the negative plates of the lithium battery.

9. The method of forming a lithium battery according to claim 6, wherein the electro-conductive polymer binding agent is mixed with the silicon-based negative electrode material in deionized water to form a negative electrode slurry, and a copper foil is coated with the negative electrode slurry, followed by drying and slicing to obtain the negative plates of the lithium battery.

* * * * *